Jan. 26, 1965  F. I. BROSSARD  3,167,036
READING STAND
Filed Feb. 12, 1963  3 Sheets-Sheet 3
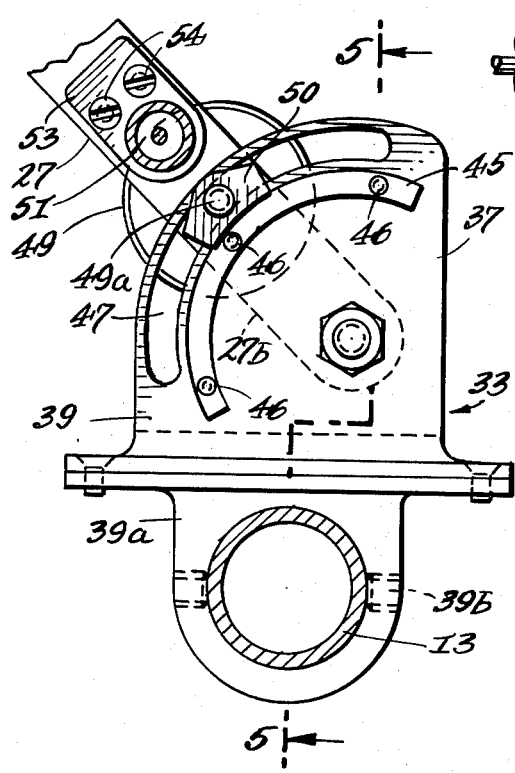
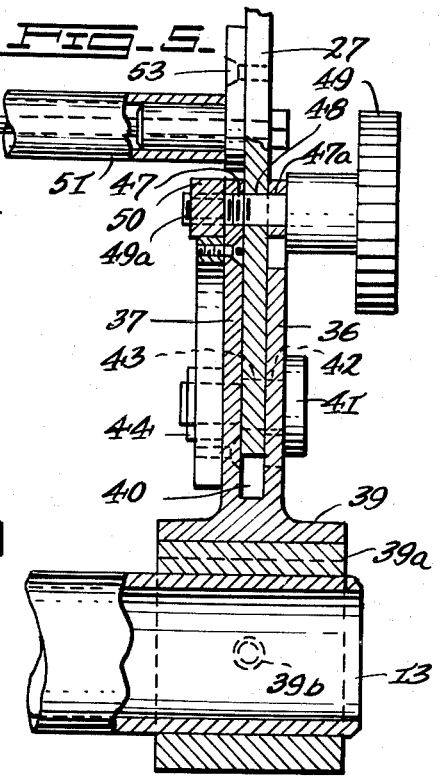
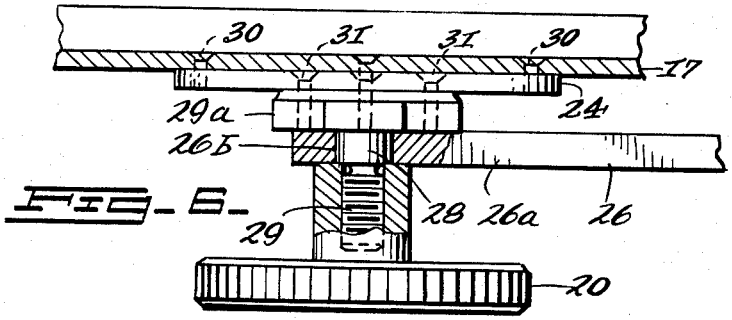
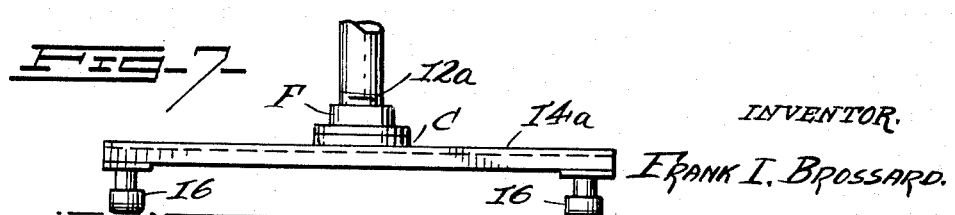
INVENTOR.
FRANK I. BROSSARD.

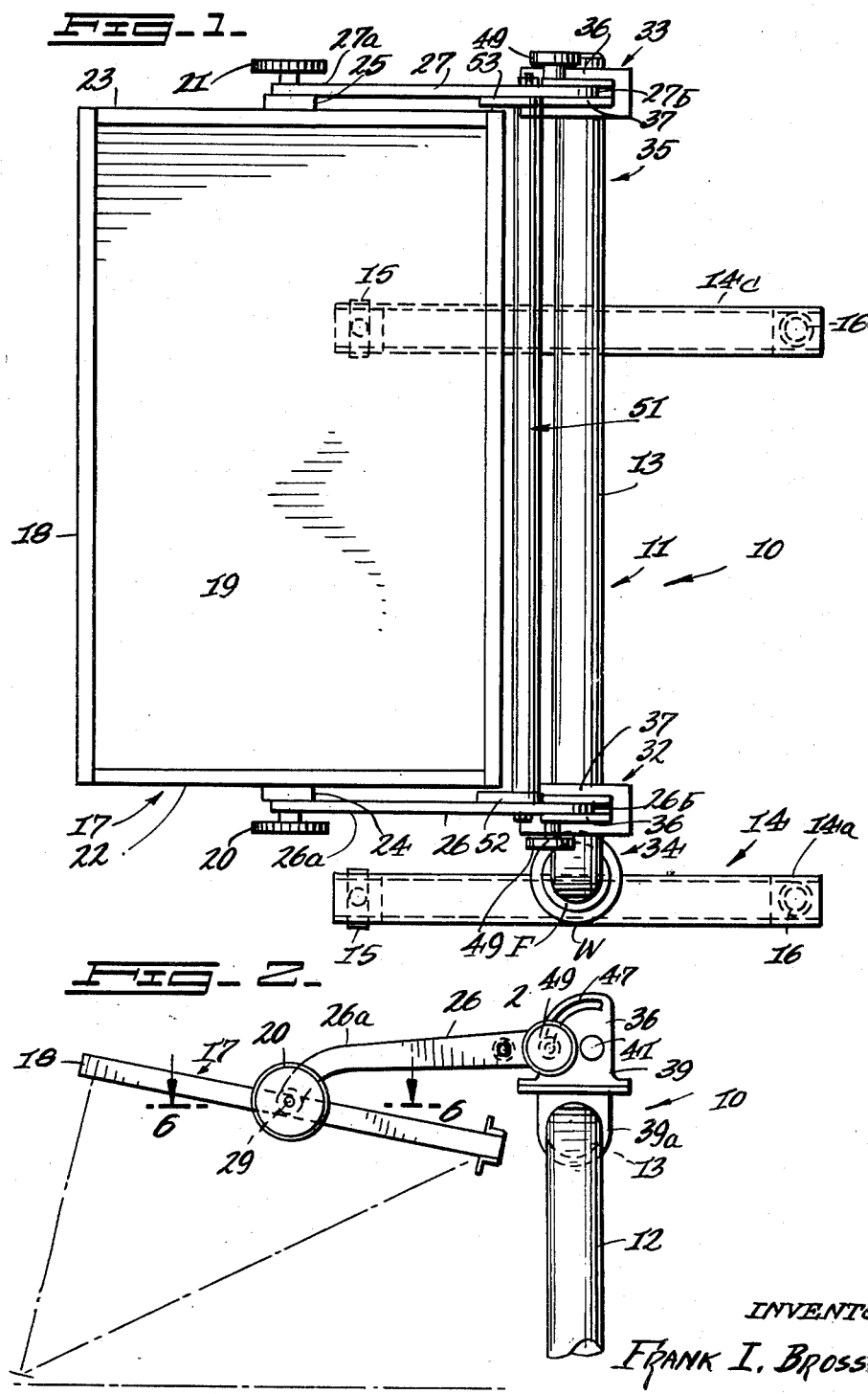

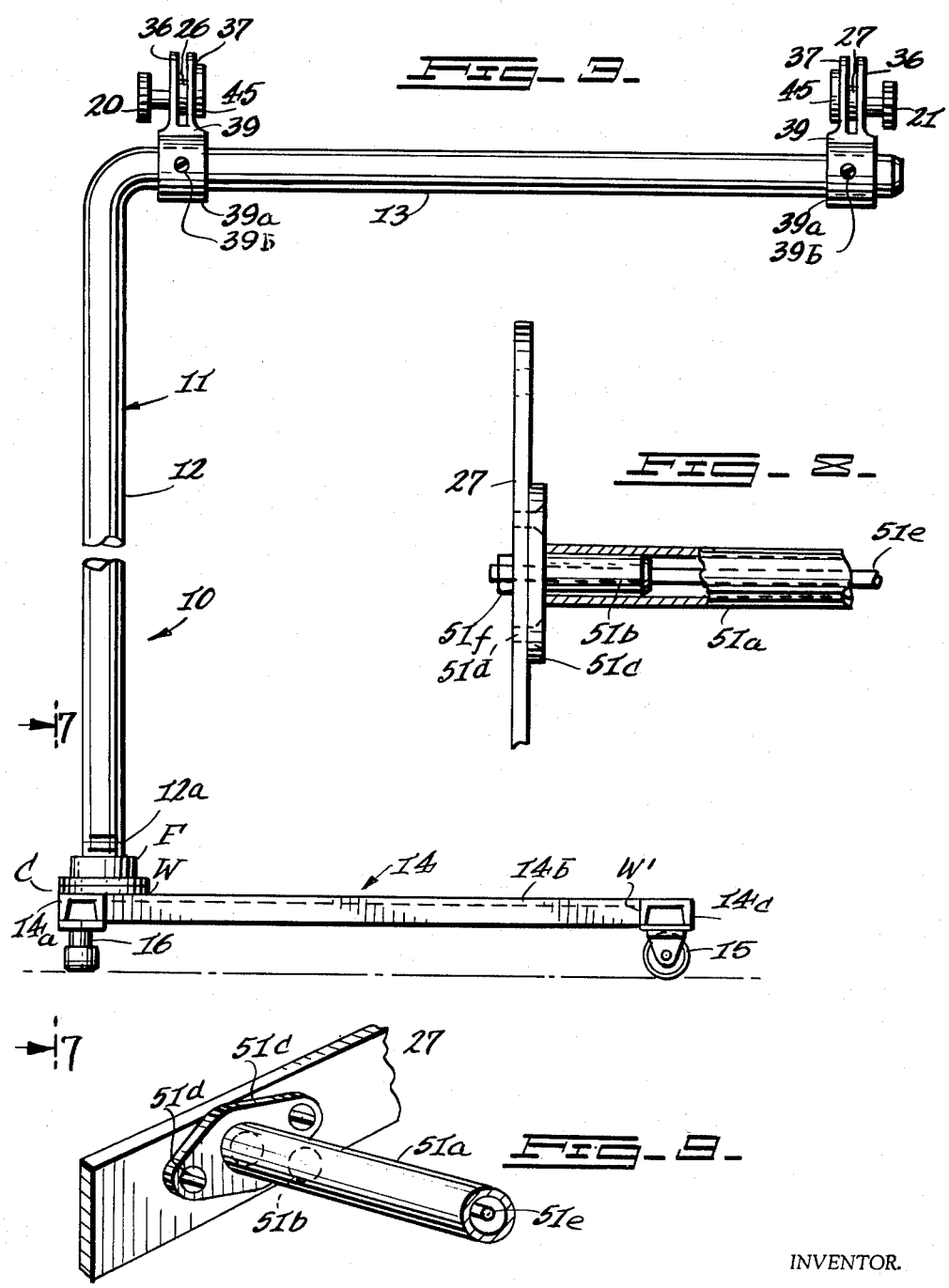

United States Patent Office 3,167,036
Patented Jan. 26, 1965

3,167,036
READING STAND
Frank I. Brossard, 3912 Martin Drive, San Mateo, Calif.
Filed Feb. 12, 1963, Ser. No. 257,959
2 Claims. (Cl. 108—4)

The present invention relates to reading stands, and more particularly to such stands which may be readily used in hospitals and at home by people who are incapacitated, either by illness or injury, and who may read or look through books and magazines by means of this stand without being obliged to hold them manually. Accordingly, the primary object of this invention is to provide a reading stand which may hold printed matter in position for reading for those who cannot hold books or magazines in their hands, and also to permit the stand to be rotated, and raised and lowered in order to meet the numerous situations encountered.

Another object of this invention is to provide a reading stand with a transparent flexyglass sheet over which printed matter may be placed so that the patient, lying comfortably upon his back, may read up through the transparent sheet.

An additional object of this invention is the provision of a movable platform with wheels upon which the stand is mounted on a tubular frame, permitting the platform to be wheeled under the patient's bed.

A further object of this invention is the provision of a reading stand which may be inexpensive to manufacture, and easy and safe to operate.

This invention also consists in certain other features of construction, and the combination and arrangement of parts, to be hereinafter fully described, illustrated in the accompanying drawings, and specifically pointed out in the appended claims.

In describing the invention in detail, references will be made to the accompanying drawings where like character numerals denote like or corresponding parts throughout the several views, in which:

FIG. 1 is a plan elevational view showing the embodiment of the present invention;

FIG. 2 is a side elevational view of FIG. 1;

FIG. 3 is a rear view of FIG. 1;

FIG. 4 is a detailed view of the tilting bracket for the reading board;

FIG. 5 is a view on the line 5—5 of FIG. 4;

FIG. 6 is a section on the line 6—6 of FIG. 2;

FIG. 7 is a view on the line 7—7, of FIG. 3;

FIG. 8 is a plan view, partly in section, showing a modified form of a connecting rod for adding rigidity to the swiveling arms of the table structure; and FIG. 9 is a perspective view of this modification.

Referring now more particularly to the drawings, the reading stand 10, made in accordance with the present invention, shown in FIG. 1, comprises, in combination, the upright tubular frame 11, mainly consisting of the vertical section 12 (FIG. 3), and the horizontal section 13 (the latter formed out of the vertical section 12 disposed 90 degrees thereto). The tubular frame 11 is held upon the wheeled carriage 14, which is mounted to be rolled freely upon the caster rollers 15. Also, the carriage 14 is provided with a pair of legs 16, to mount it stationary under the patient's bed (not shown).

The tiltable table 17, as can be seen best from FIG. 1, primarily consists of the rectangular frame 18 which holds the transparent flexiglass sheet 19 (the patient reads up, through the transparent sheet). It is obvious that the table 17 may be rotated 360 degrees about its horizontal axis by means of the clamp screws 20 and 21 which are mounted at either end, 22 and 23, of the tiltable table 17, upon the connecting plates 24 and 25. Likewise, the table 17, by means of the clamp screws 20 and 21, is mounted upon a pair of swiveling arms 26 and 27, which are disposed at either side, 22 and 23, thereof.

Referring more particularly to the swiveling arms 26 and 27, as best seen from FIGS. 4, 5 and 6, the ends 26a and 27a may carry holes 26b, which by means of the stems 28 (of the clamp screws 20 and 21), and threaded studs 29 in the connecting plates 24 and 25, are directly held upon the frame 18 of the tiltable table 17. The connecting plates 24 and 25 are held to the frame by means of the machine screws 30, while each threaded stud 29, by means of its supporting section 29a, is securely mounted to the supporting plate 24, by the machine screws 31. It is understood that the opposite arm 27 at the end 23 of the tiltable table is similarly supported, as already, above described for the table end 22.

The opposite ends 26b and 27b of the swiveling arms 26 and 27 are being held in the arm clamps 32 and 33, respectively, which are disposed at either end, 34 and 35, of the horizontal tubular section 13 in the upright frame 11. Referring more particularly to the arm clamp 33 in the arm 27, best seen in FIGS. 4 and 5, primarily it consists of a pair of flat upright side frames or brackets 36 and 37, which extend from the base plate 39 to form the slotted section 40. The section 40, by means of the retainer screw 41, which is mounted in the hole 42 in the upright side frame 36, receives the end 27b of the swiveling arm 27. The retainer screw 41, also, passes through the swiveling hole 43, in the arm 27, and is made tight by means of the hexagon nut 44. By means of the bearing supports 39a, the bases 39 are securely held upon the tubular section 13 by the set screws 39b.

By means of the machine screws 46, a segmented arcuate section 45 is securely held upon the upright side frame 37, having an arcuate slot 47, which is machined into the side frame 37, and run parallel to the segmented section 45. The arm 27, somewhat above its swiveling hole or center 43, carries another hole 48, which is fitted with the threaded lock screw 49, the latter passing through the segmented slots 47 and 47a, in the side frames 36 and 37, and by means of the threaded extension 49a is securely held to the segmented block 50. The segmented block 50 is so formed as to fit snugly, and to ride freely, over the section 45, substantially as shown in FIG. 4. To add over-all rigidity to the entire tiltable table structure, a connecting tubular rod 51 may be mounted between the swiveling arms 26 and 27 (see FIG. 1) and rigidly held thereto by means of the bracketed members 52 and 53, with the latter being secured to the arms 26 and 27 by means of the machine screws 54.

Referring more particularly to the wheeled base 14, as can best be seen from FIGS. 3 and 7, primarily it consists of the channels 14a, 14b and 14c, which are welded together to form an H-type welded base, with the channel 14b being welded at W, to the channel 14a, and at W' to the channel 14c. At either end thereto, the channel 14c carries the caster rollers 15, while the channel 14a has a pair of upright legs 16. The vertical section 12 of the upright tubular frame 11, by means of its treaded lower section 12a, is mounted to the flange F, which is welded to the cross section C, where the channel 14a is joined to the channel 14b, substantially as shown in FIGS. 1 and 3.

FIGS. 8 and 9 show a modification. In this case the connecting tubular rod 51a is being held upon the tiltable arms 26 and 27 by means of the studs 51b, which are in turn supported upon their bases 51c. The latter, by means of the machine screws 51d, are securely held to the arms 26 and 27, respectively, while a tie bar 51e, passing through the rod 51a, is held by means of the nuts 51f to the arms 26 and 27.

It will be recognized now, from FIGS. 1, 2, 3, 4, and 5, that the tiltably mounted reading table 17 may be readily positioned in any reading angle desirably, by simply swiveling, or tilting, the arms 26 and 27 upon their respective supporting frames 36 and 37, which are being held upon the horizontal section 13, of the tubular frame support 10. This action is accomplished by loosening the lock screws 49 and moving the arms 26 and 27 in an arc about their swiveling centers in the screws 41. When the proper reading angle, satisfactory to the patient lying upon his back on the hospital bed, is reached, then, by means of the lock screws 49, the tiltable arms 26 and 27 are made tight in the desired position. In the event that additional adjustment of the position of the tiltable arms 26 and 27 is desired, this can be easily accomplished by loosening the tightening screws 20 and 21 (at either end, 22 and 23, of the tiltable table 19), thus permitting the rotation of the table around its center in the full 360 degrees of the arc. When the proper angle, desirable to the patient is reached, the tiltable table 17 is made fast in the position desired by tightening upon the screws 20 and 21, respectively.

A careful examination of the foregoing description in conjunction with the invention as illustrated in the drawings, will enable the reader to obtain a clear understanding and impression of the alleged features of merit and novelty sufficient to clarify the construction of the invention as hereinafter claimed.

Minor changes in shape, size, materials and rearrangement of parts may be resorted to in actual practice as long as no departure is made from the invention claimed.

What I claim is as follows:

1. A tiltable reading stand of the class described, comprising, in combination, a tiltable table having a rectangular frame, a pair of tiltable arms upon which said frame is tiltably mounted, a pair of supporting brackets, said frame having two short sides and two long sides, hinging points at either one of the short sides of said table, tightening screws in said hinging points, said screws mounting each hinging point in said table to one end of said tiltable arms to permit said table to be adjustably secured around its transverse axis, the opposite ends of each tiltable arm having a swiveling point, each arm being supported by its swiveling point to one bracket in said pair, with one arm being supported to one bracket and the other arm being supported to the other bracket, each bracket in said pair being provided with an arcuate slot, an arcuate segmented section held to each bracket paralleling said slot, each arm having a tightening screw fitted in said slot and secured to a sliding block, said block having an arcuate section, the loosening of said latter tightening screw in said bracket permitting the sliding movement of said block upon said arcuate segment, and the tightening of said latter screw discontinuing said movement.

2. A tiltable reading stand of the class described, comprising, in combination, a tiltable table having a rectangular frame, a pair of tiltable arms upon which said frame is tiltably mounted, a pair of supporting brackets, said frame having two short sides and two long sides, hinging points at either one of the short sides of said table, tightening screws in said hinging points, said screws mounting each hinging point in said table to one end of said tiltable arms to permit said table to be adjustably secured around its transverse axis, the opposite ends of each tiltable arm having a swiveling point, each arm being supported by its swiveling point to one bracket in said pair, with one arm being supported to one bracket and the other arm being supported to the other bracket, a connecting tie means between each of said arms, a pair of mounting brackets secured to the arms, said tie means comprising a spacer mounted between each of said tiltable arms and secured to the latter brackets, and a tie rod in said spacer with nuts to secure one arm in said pair to the other arm in said pair, as set forth.

References Cited by the Examiner
UNITED STATES PATENTS

| | | | |
|---|---|---|---|
| 533,697 | 2/95 | Baker | 108—8 |
| 976,759 | 11/10 | Weingaertner | 108—8 |
| 1,512,291 | 10/24 | McGuire | 108—8 |
| 1,867,763 | 7/32 | Rose | 108—8 |
| 2,346,919 | 4/44 | Hillenbrand | 108—8 |
| 2,480,233 | 8/49 | Fuller | 108—4 |
| 2,546,283 | 3/51 | Webster | 108—8 |
| 2,848,290 | 8/58 | Doty | 108—8 X |

FRANK B. SHERRY, *Primary Examiner.*